United States Patent [19]

Viard

[11] Patent Number: 4,833,826

[45] Date of Patent: May 30, 1989

[54] CLOSURE DEVICE HAVING A HINGED CLOSURE MEMBER

[75] Inventor: Alain Viard, Les Clayes Sous Bois, France

[73] Assignee: Matra Automobile, Paris, France

[21] Appl. No.: 176,758

[22] Filed: Apr. 1, 1988

[30] Foreign Application Priority Data

Apr. 3, 1987 [FR] France .............................. 87 04735

[51] Int. Cl.$^4$ .............................................. E05D 15/28
[52] U.S. Cl. ......................................... 49/246; 49/261
[58] Field of Search ........................... 49/246, 261, 40; 296/146

[56] References Cited

U.S. PATENT DOCUMENTS

| | | | |
|---|---|---|---|
| 2,551,054 | 5/1951 | Sanmori | 49/246 X |
| 4,632,447 | 12/1986 | Nomura et al. | 296/146 X |
| 4,641,881 | 2/1987 | Nomura et al. | 296/146 X |
| 4,650,241 | 3/1987 | Motonami et al. | 296/146 X |
| 4,684,167 | 8/1987 | Newmayer | 296/146 X |

FOREIGN PATENT DOCUMENTS 8520432.3 10/1986 Fed. Rep. of Germany .

*Primary Examiner*—Philip C. Kannan
*Attorney, Agent, or Firm*—Larson and Taylor

[57] ABSTRACT

The closure device is suitable for use as a lateral door or a back door of a passenger vehicle. It comprises a closure member movable between a closure position on a frame and a fully open position. The linkage connecting the closure member to a body provided with the frame has first arms and second arms. The first arms are pivotally mounted on the body for rotation about a horizontal axis and are pivotally mounted at their other end on a closure member about another axis parallel to the first axis. The second arms each have an end mounted on the body for pivotal movement about a horizontal axis parallel to the other axis and another end pivotally mounted on the closure member for rotation about an axis parallel to the other axis. The second arms are telescopic and have a retracted condition in which they have a first length and an expanded condition in which they have a second length greater than the first length. The second arms are in retracted condition until the amount of pivotal movement of the second arm means from the closed condition of the closing device has exceeded a predetermined extent.

9 Claims, 3 Drawing Sheets

CLOSURE DEVICE HAVING A HINGED CLOSURE MEMBER

BACKGROUND OF THE INVENTION

1. Technical Field

The invention relates to closure devices having a closure member movable between a fully open position and a closed position in which it is applied against a stationary member having a frame for receiving it. It is particularly suitable for use in motor vehicles.

2. Prior Art

Most closure devices for access to a vehicle include a door which generally pivots about a single axis, substantially vertical for the doors of private vehicles, horizontal for the back doors of so called five door vehicles and station wagons.

It is only possible to fully open the door of such a device if the space required for it to swing about an axis is free. This condition is frequently not fulfilled in garages. And the sudden opening of a door with considerable side projection, when the driver wishes to get out into the path of the traffic, is the source of accidents. On some automobiles, particularly sport cars "butterfly" access doors hinged at their upper ends have also been used.

A device is known (German U.M. No. 85 204-32.3) for opening and closing the bonnet of the engine compartment of a motor vehicle. The opening movement of the bonnet is guided by an arm whose ends turn about mounted by end axes on the bodywork and on the bonnet and by a finger fixed to the bodywork and slidably received in a slide fixed to the bonnet. An opening air spring pushes the bonnet into its fully open position when the bonnet is unlocked. This arrangement avoids interference between the bonnet and other elements of the vehicle during opening. It does not reduce the vertical space required for the bonnet to come into its open position and the opening spring plays only its natural role.

SUMMARY OF THE INVENTION

It is an object of the invention to decrease the amount of free space required for fully opening a closure member while allowing the closure member to come into a position in which it completely clears the frame of the casing and provides full access. It is a more specific object of the invention to provide an access door for a passenger car or limousine of the "butterfly" type which requires less overhead room for full opening.

For that purpose, there is provided a closing device comprising a stationary body having a frame defining an opening, a closure member movable between a closed position where it is applied against said frame and a fully open position clear of said frame and a linkage connecting said stationary body and frame. The linkage has first arm means having an end portion pivotally mounted on said body for movement about a predetermined direction and another end portion pivotally mounted on a proximal end part of said closure member about an axis parallel to said direction. The linage further comprises second arm means having an end portion mounted on said body for pivotal movement about said predetermined direction and having another end portion pivotally mounted on the closure member for rotation about an axis parallel to said direction. The second arm means are telescopic and have a retracted condition in which they have a first length and an expanded condition in which they have a second length greater than the first length. Means are provided for maintaining the second arm means in retracted condition until the amount of pivotal movement of the second arm means from the closed condition of the closing device has exceeded a predetermined extent.

The closure member is typically an access door of a passenger vehicle. Then the frame may extend over one side and a fraction of the roof of the bodywork of the vehicle. It may extend over the major length of the side to give access to the front and rear seats simultaneously. The closure member will typically be formed by a curved shape having an upper (proximal) portion which is substantially horizontal when closed, giving easier access when in open condition. The axes are horizontal, the first one being at the upper end of the door and the second preferably in the vicinity of a bend of the door.

The telescopic means will often be in the nature of one or more gas pressure cylinders. A particularly simple and advantageous solution consists in using pneumatic springs having a valve whose opening actuates the spring so as to exert an extension force from a retracted position. Opening of the valve mean be controlled by a cam surrounding the axis about which the telescopic means pivot.

The invention will be better understood from the following description of a particular embodiment thereof, given by way of example and forming an access door to a vehicle. The description refers to the accompanying drawings.

DETAILED DESCRIPTION OF A PARTICULAR EMBODIMENT

Figure 1:
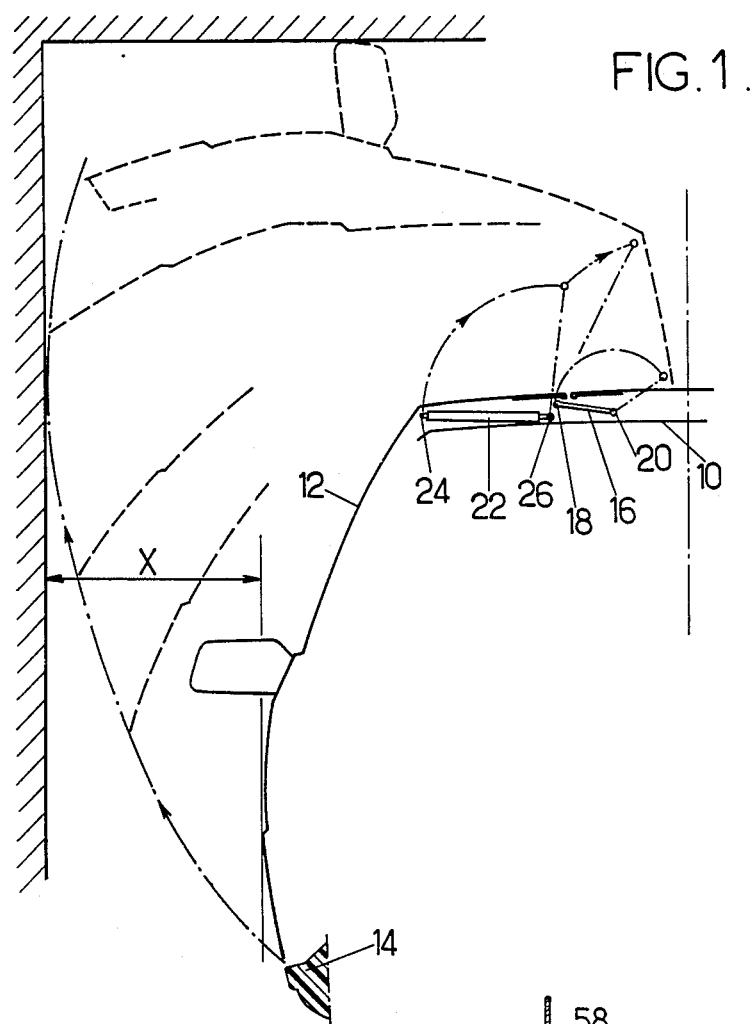
FIG. 1 schematically shows the successive positions taken by the closure member of the device during its opening movement.
Figure 2:
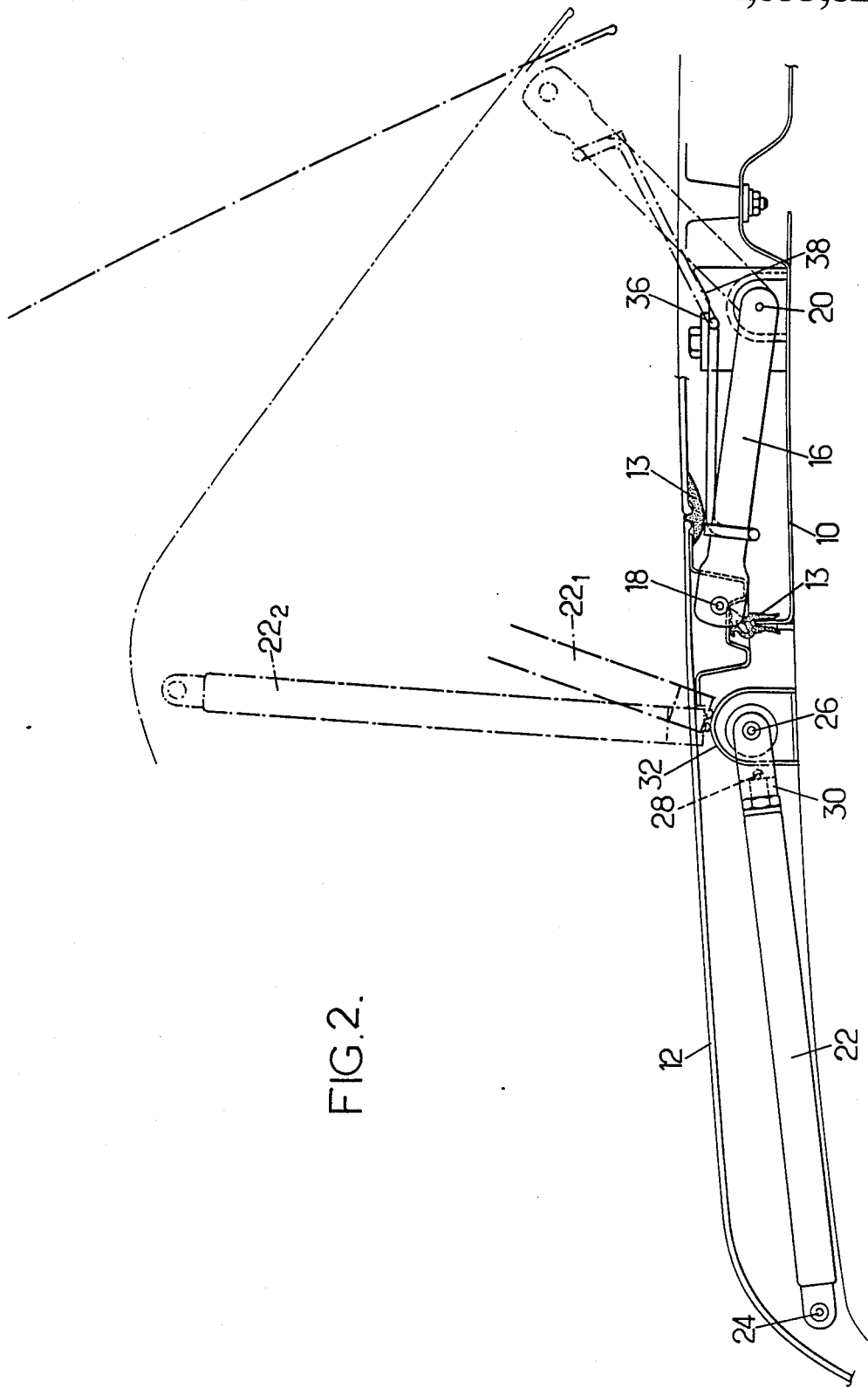
FIG. 2 is a simplified view of the device in cross-section perpendicularly to the axes, showing the means inserted between the closure member and the frame.

FIGS. 1 and 2 schematically show part of the structure 10 of a vehicle having a closure member 12 forming a side access door. The upper portion of the structure and a lower beam 14 of large cross-section provide longitudinal rigidity. A front hoop, which may carry the windscreen, and a rear hoop have portions slightly slanted with respect to the vertical and forming door feet. One or more seals 13 (FIG. 2) against which the closure member 12 is applied when closed are fixed to the door feet, to the body portion bottom and to the upper portion of the structure so as to receive the closure member in the closed position.

Figure 4:
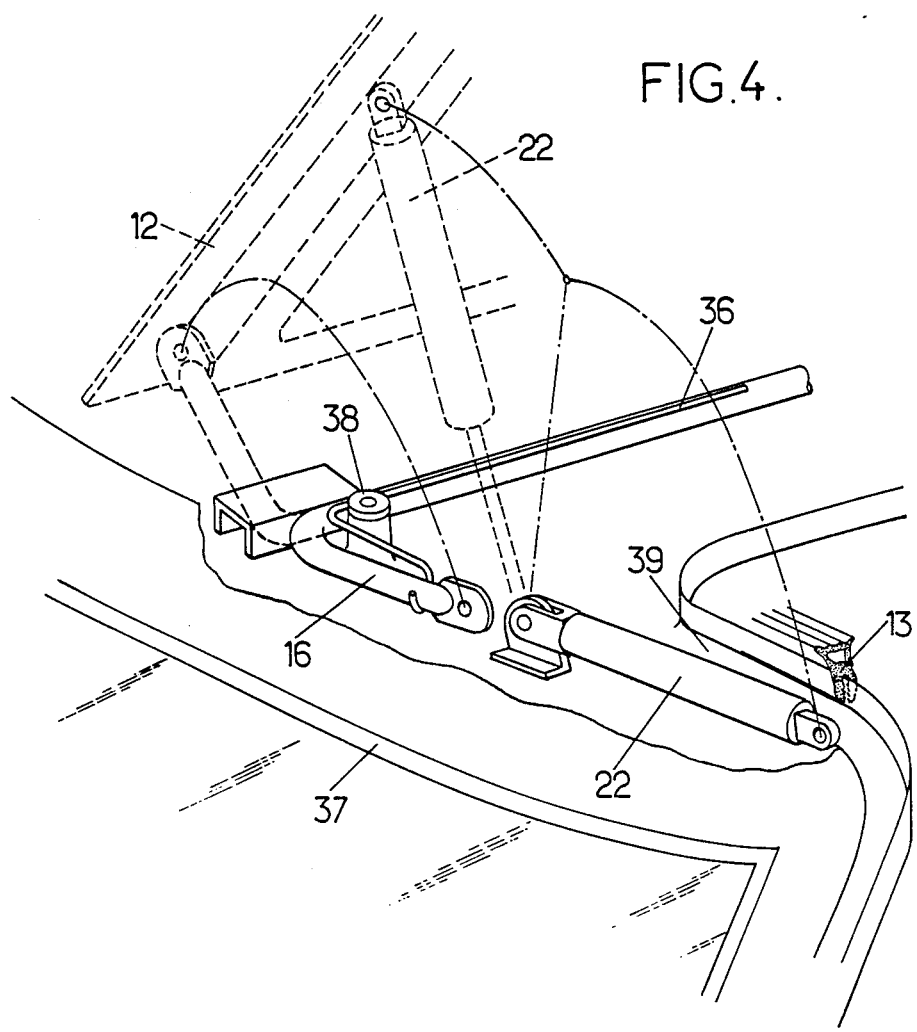
FIG. 4 is a detailed isometric view with parts cut away showing how the different components shown in FIG. 2 may be integrated in the structure of a vehicle.

The closure member 12 is connected to structure 10 by an articulation linkage which comprises:

pivoting arm means of fixed length, formed by a set of two links 16 hinged to the closure member 12 about a hinge axis 18 placed close to the top (proximal) end of the closure member and to the fixed structure 10 about an axis 20 parallel to the first one; as shown in FIG. 4, the two links may form two ends arms of a U-shaped structure whose rigidity interlocks the links and avoid warping of the closure member;

telescopic arm means formed by a set of two gas springs 22 hinged to the closure member 12 about an axis 24 parallel to axes 18 and 20 and situated in the curbed zone of the closure member and to the fixed structure 10 about an axis 26 defined by a pin carried by a lug 32.

Each link 16 and the as spring 22 placed on the same side of the closure member form the two movable sides of a quadrilateral linkage which has a deformable shape.

The gas spring 22 includes a valve which is normally closed and which, when opened, energizes the gas spring, i.e. causes it to exert a force tending to extend the spring from the retracted state in which it is shown with a continuous line in FIG. 2 to the extended state $22_2$ in which it is shown with broken lines in FIG. 2. Opening of the valve of the gas spring is controlled by pressing a push button 28 which projects radially towards the hinge axis 26, between the arms of an end fork 30 of the piston rotatable about axis 26. Lug 32 forms a fixed cam for opening the valve and causing self-extension of the gas spring 22 when, during the opening movement of the closure member 12, the latter arrives in a predetermined position corresponding to position $22_2$ of the spring (FIG. 2). One or more stops 38 carried by the fully open position of closure member 12. Gas springs provided with appropriate valves are available in the trade and consequently no description thereof is necessary.

As shown in FIG. 1, the closure member in its fully open position does not extend internally beyond the plane of symmetry of the vehicle yet completely frees the access.

Figure 3:
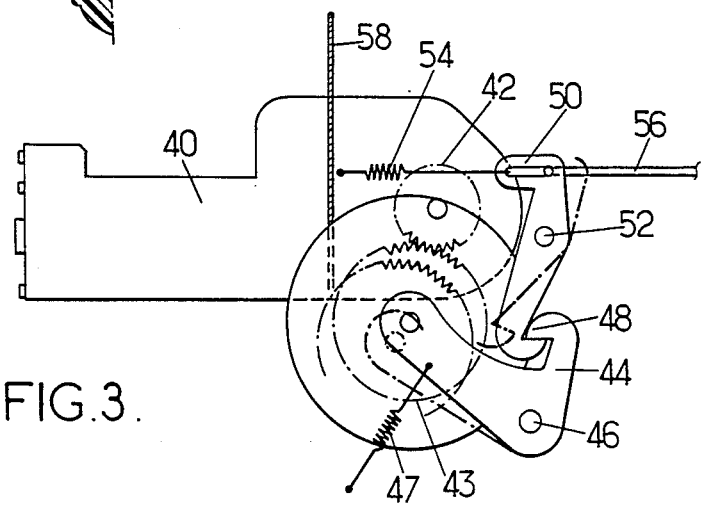
FIG. 3 shows a possible construction of means for opening and closing the device of FIGS. 1 and 2.

As shown in FIG. 2, the device is provided so that the force required for opening the closure member is provided by energy storage means. Closure may be caused by lowering the door or by pulling a strap fixed to the closure member 12 in the lower (distal) portion thereof at a location where it does not hinder access, manually or—for increasing the comfort in use—be controlled by a motor (FIG. 3). For that purpose, the fixed structure has one or more torsion bars 36 whose bent end parts are engaged under links 16 and bias them from the position shown with continuous lines to the position shown with broken lines in FIG. 2.

The device will typically include two linkages 2 and 4, each having the construction shown in FIG. 1, each placed on one side of the door. The linkages are hidden, when the device is closed, by lateral portions of the closure member. The space required for housing link 16, the gas springs 22 and torsion bars 36 may be provided in a gutter of the structure extending along the frame of the windscreen 37. Referring to FIG. 4, the link 16 and the gas spring 22 retracted into gutter 39 when the closure member is closed are shown in continuous line and the position which they take up when closure member 12 is in abutment is shown with broken lines. Each bearing for holding the link and the torsion bar in position also forms an end-of-travel stop 38.

Referring to FIG. 3, a motor driven closure mechanism comprises an electric motor 40 carried by the fixed structure and having an output pinion 42. A ring gear 43 is pivotally carried by one of the arms of a bell crank lever 44 which pivots on the fixed structure about a pin 46. A spring 47 exerts a force on lever 44 which tends to move the ring gear 43 away from gear 42 and to bring it from the position shown with a continuous line to that shown with a broken line. The second arm of lever 44 has a hook 48 for locking engagement with a complementary hook provided on a control lever 50. The control lever 50 is pivotally received on a fixed pin 52 and a spring 54 forces it toward a position, shown with continuous lines, in which it retains the lever 44. A control linkage 56, connected for example to an opening handle placed on the lower body portion of the vehicle inside the body work and/or outside, makes it possible to bring lever 50 into the position shown with broken lines in FIG. 3 for releasing the bell crank lever 44. A switch (not shown) then switches on motor 40; the motor is de-energized by an end-of-travel stop included in the device when the door closes.

The ring gear 43 is fixed to a pulley on which is wound a strap 58 whose length is selected so that, at the end of the opening travel of the closure member, the strap is stretched and brings the ring gear 43 and hook 44 into the position for engagement of the ring gear with pinion 42 (as shown with continuous lines in FIG. 3).

The device which has just been described operates as follows.

When a pulling action is exerted on rod 56 due to manual actuation, lever 50 comes into the position shown with broken lines. Hook 48 is released. The ring gear 43 separates from the drive pinion 42 and becomes free to rotate. The torque exerted by torsion bar 36 on link 16 raises the door, while strap 58 unwinds. When the gas spring 22 arrives to position $22_2$ (FIG. 2) (and at the same time link 16 comes into abutment against stop 38), cam 32 opens the valve of the gas spring. The latter extends to the position $22_1$.

During its winging movement, the closure member follows the trajectory shown in FIG. 1: for a car door of usual size, a free lateral distance x = 30 cm and a free height which is also small are sufficient for providing completely unobstructed access.

When the closure member arrives at the end of its travel, it stretches strap 58 fixed to ring gear 43; the strap causes ring gear 43 to mesh with pinion 42 and re-lockhook 48 on lever 50.

When the closure switch is operated, motor 40 drives pinion 42 and pulls the closure member downwards while successively causing retraction of the gas spring 22 then rotation of the door as a unit until it is completely closed. A bottom end-of-travel stop switches off the motor when closure is ensured. During downward movement, the rotation of links 16 winds up the torsion bars 36 for storage of energy required for later opening.

I claim:

1. A closing device comprising: a stationary body having a frame defining an opening: a closure member movable between a closed position where it is applied against said frame and a fully open position clear of said frame; and a linkage connecting said stationary body and frame; wherein said linkage has;

first arm means having an end portion mounted on said body for pivotal movement about an axis having a predetermined direction and another end portion pivotally mounted on a proximal end part of said closure member about another axis parallel to said predetermined direction;

second arm means having an end portion mounted on said body for pivotal movement about another axis parallel to said predetermined direction and another end portion pivotally mounted on the closure member for rotation about still another axis parallel to said predetermined direction, said second arm means being telescopic and having ar retracted condition in which they have a first length and an expanded condition in which they have a second length greater than the first length; and means for maintaining the second arm means in retracted condition until the amount of pivotal movement of the second means from the closed condition of the closing device has exceeded a predetermined extent.

2. A closing device according to claim 1, wherein said closure member is an access door for a passenger vehicle and said predetermined direction is horizontal.

3. A closing device according to claim 2, wherein said first and second arm means are so arranged and connected that they pivot in the same direction during opening until said second arm means has reached said predetermined extent and said first arm means then remains in abutment during extension of said second arm means.

4. A closing device according to claim 2, wherein said frame extends over a fraction of the roof of the vehicle and a major part of one side thereof so as to give access to front and rear seats simultaneously.

5. A closing device according to claim 2, wherein the closure member is formed by a panel of curved shaped having an upper portion which is substantially horizontal when closed.

6. A closing device according to claim 5, wherein said first and second arm means are connected to the door at the upper end thereof and in the vicinity of a horizontal bend of the door, respectively.

7. A closing device according to claim 1, wherein the telescopic means are gas pressure cylinders.

8. A closing device according to claim 1, wherein the telescopic means are pneumatic springs having a valve whose opening actuates the springs so as to exert an extension force from said retracted condition.

9. A closing device according to claim 8, wherein opening of the valve is controlled by cam surrounding one of the axes about which the second arm means pivot.

* * * * *